US011876264B2

United States Patent
Arya et al.

(10) Patent No.: US 11,876,264 B2
(45) Date of Patent: Jan. 16, 2024

(54) SYSTEM FOR SUPPLYING COMPRESSED AIR TO A FUEL CELL SYSTEM

(71) Applicant: Volvo Truck Corporation, Gothenburg (SE)

(72) Inventors: Pranav Arya, Lindome (SE); Johan Lindberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/829,506

(22) Filed: Jun. 1, 2022

(65) Prior Publication Data

US 2022/0393206 A1    Dec. 8, 2022

(30) Foreign Application Priority Data

Jun. 7, 2021   (EP) .................................... 21177963

(51) Int. Cl.
*H01M 8/04746* (2016.01)
*B60L 50/72* (2019.01)
(Continued)

(52) U.S. Cl.
CPC ......... *H01M 8/04776* (2013.01); *B60L 50/72* (2019.02); *B60L 58/33* (2019.02);
(Continued)

(58) Field of Classification Search
CPC ......... H01M 8/04776; H01M 8/04126; H01M 8/04201; H01M 2250/20; H01M 8/04089;
(Continued)

(56) References Cited

U.S. PATENT DOCUMENTS

| 2014/0203636 | A1  | 7/2014  | Goetz et al. |
| 2016/0359181 | A1* | 12/2016 | Lee .................. H01M 8/04425 |
| 2021/0372412 | A1* | 12/2021 | Kemmer ................. F04D 17/12 |

FOREIGN PATENT DOCUMENTS

| DE | 102007007934 A1 | 8/2008 |
| DE | 102010052797 A1 | 5/2012 |
| DE | 102015110724 A1 | 10/2016 |

OTHER PUBLICATIONS

Extended European Search Report for European Patent Application No. 21177963.2, dated Dec. 10, 2021, 7 pages.

* cited by examiner

*Primary Examiner* — Stewart A Fraser
(74) *Attorney, Agent, or Firm* — Withrow & Terranova, PLLC (57) ABSTRACT

System for supplying compressed air to a fuel cell of a vehicle, comprising a first compressor having an inlet for receiving air and an outlet for delivering compressed air to the fuel cell; an air storage tank arranged upstream and in series with the first compressor and configured to store compressed air of high pressure; an air selection control assembly comprising a selection valve and a switch actuator configured to operate the selection valve, wherein said selection valve is arranged in between air storage tank and inlet of the first compressor, and further in fluid communication with an inlet conduit for receiving fresh air, said switch actuator being configured to operate the selection valve to selectively control flow of air to the first compressor such that air can be supplied from the air storage tank to the first compressor or from the fresh air inlet conduit to the first compressor.

12 Claims, 2 Drawing Sheets

(51) Int. Cl.
*B60L 58/33* (2019.01)
*B60T 17/02* (2006.01)
*H01M 8/04119* (2016.01)
*H01M 8/04082* (2016.01)

(52) U.S. Cl.
CPC ......... *B60T 17/02* (2013.01); *H01M 8/04126* (2013.01); *H01M 8/04201* (2013.01); *H01M 2250/20* (2013.01)

(58) Field of Classification Search
CPC ............. H01M 8/0438; H01M 8/0606; H01M 8/04111; B60L 50/72; B60L 58/33; B60L 50/75; B60T 17/02
See application file for complete search history.

SYSTEM FOR SUPPLYING COMPRESSED AIR TO A FUEL CELL SYSTEM

RELATED APPLICATIONS

The present application claims priority to European Patent Application No. 21177963.2, filed on Jun. 7, 2021, and entitled "SYSTEM FOR SUPPLYING COMPRESSED AIR TO A FUEL CELL SYSTEM," which is incorporated herein by reference in its entirety.

FIELD OF THE DISCLOSURE

The present disclosure relates to a system for supplying compressed air to a fuel cell system of a vehicle and to a fuel cell system provided with such a system. The present disclosure may typically be applied in a fuel cell system used as a part of an electric powertrain system of heavy-duty vehicles, such as trucks, buses, and construction equipment. The present disclosure may likewise be applied in other vehicles such as cars and other light-weight vehicles etc., but also in marine vessels and the like.

BACKGROUND

There is an increasing development of alternative power sources and propulsion systems for heavy vehicles aimed at supplementing or replacing combustion engines. One such power source is a fuel cell system capable of converting hydrogen into electrical energy where the electrical energy in turn can be used for vehicle propulsion.

In these types of fuel cell systems, there is generally a requirement of having a compressor for ensuring a high flow rate of compressed air for producing power in an efficient manner together with the supply of hydrogen. Therefore, nearly all modern fuel cells have a compressor included in the balance of plant of the fuel cell system.

DE 10 2010 052 797 A1 discloses one example of a fuel cell system for a vehicle having an oxidant supply installation part attached to a fuel cell unit. In addition, the vehicle comprises an electrically driven compressor unit and an oxidant storage tank arranged for handling dynamic load changes of the fuel cell system.

Despite the activity in the field, it would be desirable to further improve the operation of the fuel cell system during certain operational conditions.

Furthermore, in the field of heavy-duty vehicles, such as trucks, the requirements and operating conditions are often different compared to fuel cells for passenger cars. For example, the demands on the fuel cell system of a heavy-duty vehicle are generally higher compared to the demands on fuel cell systems for passenger cars due to the weight and the extensive operational loads of the trucks. Also, some types of electric heavy-duty vehicles generally include additional power sources besides the fuel cell system. In view of the aforesaid, it would also be desirable to improve the overall reliability of a fuel cell system of a heavy-duty vehicle.

SUMMARY

An object of the disclosure is to provide an improved operation of a fuel cell system, in which compressed air can be supplied to a fuel cell of the fuel cell system in a more reliable manner also at high altitudes. The object is at least partly achieved by a system according to independent claim 1 and also defined in the other independent claims. The dependent claims relate to advantageous embodiments.

According to a first aspect of the disclosure, there is provided a system for supplying compressed air to a fuel cell of a vehicle. The system comprises a first compressor having an inlet for receiving air and an outlet for delivering compressed air to the fuel cell; an air storage tank arranged upstream and in series with the first compressor, and configured to store compressed air of high pressure; an air selection control assembly comprising a selection valve and a switch actuator configured to operate the selection valve. The selection valve is arranged in-between the air storage tank and the inlet of the first compressor, and further in fluid communication with an inlet for receiving fresh air. Further, the switch actuator is configured to operate the selection valve to selectively control a flow of air to the first compressor such that air can be supplied from the air storage tank to the first compressor or from the fresh air inlet conduit to the first compressor.

The development of the system is at least partly based on the insight that conventional compressors are not able to provide the desired mass flow at sufficient pressure at high altitudes due to a decrease in the ambient pressure. The power request from fuel cell(s) may therefore need to be derated at high altitude operations. That is, as the vehicle traction motor draws current, hydrogen and oxygen become depleted in the fuel cell(s) of the fuel cell system. The hydrogen flow in the anode and the compressed air flow in the cathode are generally adjusted based on the power request from the vehicle. However, in certain driving situations relating to high power requests at high altitudes, there may be a difficulty in providing sufficient compressed air flow to the fuel cell(s) due to a lower atmospheric pressure outside the vehicle. The system according to the example embodiments is particularly useful for managing various operations of the fuel cell requiring high power requests at high altitude operations.

This advantage is at least partly provided by the arrangement of the air storage tank positioned upstream and in series with the first compressor, thereby allowing for an efficient and simple storage of compressed air of high pressure, and the arrangement of the air selection control assembly configured to selectively control the flow of air to the first compressor. As such, the air selection control assembly is configured to direct air from the air storage tank to the first compressor at high altitudes and/or during high power demands or direct fresh air from the fresh air inlet conduit to the first compressor at normal ambient pressure and/or at normal power demands.

In other words, by selectively controlling the flow of air from the air storage tank to the first compressor or from the fresh air inlet conduit to the first compressor, by means of the selection valve operable by the switch actuator, it becomes possible to improve the reliability of the system during driving situations at high altitudes where the atmospheric pressure level is inadequate for the first compressor. In such situations, the control switch is operable to direct air from the air storage tank in response to the determined atmospheric pressure level.

Hence, during driving situations at high altitudes, the system allows for providing essentially the same pressure at the inlet of the first compressor as the pressure level at the sea level. Hereby, there is provided an improved operation of the fuel cell electric vehicle (FCEV) at high altitudes. In other words, there is provided a system capable of providing compressed air to the fuel cell with a substantially equal pressure in a more reliable manner for different altitudes of the fuel cell and vehicle above sea level. The system may thus contribute to a more reliable operation of the fuel cell system in that a substantially same level of power as at sea level can be delivered to the vehicle also for driving situations at high altitudes. To this end, by arranging the air storage tank in series with the first compressor, it becomes possible to supply and use compressed air also at high altitudes in various operating situations of the fuel cell.

By way of example, when the fuel cell of the vehicle is operated at high altitudes, the stored compressed air in the air storage tank can be expanded and transferred to the air supply side (cathode side) of the fuel cell at a 1 bar pressure (at 4000 m ambient pressure is likely to be about 0.6 bar). In this manner, the system allows for providing the same pressure at the inlet of the first compressor as at the sea level. It should be noted that the operation of delivering compressed air from the air storage tank to the first compressor may generally be controlled in view of the prevailing capacity of the air storage tank. By way of example, the system is controlled on the basis of the prevailing pressure in the air storage tank and the volume of the air storage tank.

Typically, the first compressor may be arranged in direct fluid communication with the atmosphere for receiving fresh air via the inlet for receiving fresh air.

According to at least one embodiment, the air selection control assembly is controllable to control the flow of air in response to a determined air characteristic level such that a supply of air to the first compressor is provided from the air storage tank if the determined air characteristic level is below a threshold value. By way of example, the air characteristic level is any one of an ambient pressure level and an air quality level. The ambient pressure level may typically be determined by a sensor, such as a pressure sensor arranged to monitor the ambient pressure outside the vehicle. Analogously, the air quality level may be determined by a suitable sensor configured to measure the quality of the air outside the vehicle. Based on data from at least one of these sensors, the air selection control assembly is operable to control the selection valve to switch between receiving air from the fresh air inlet conduit and receiving compressed air from the air storage tank.

In addition, or alternatively, the air selection control assembly may be controllable to control the flow of air from the fresh air inlet conduit to the first compressor during normal operation of the vehicle at ambient pressure at sea level. In addition, or alternatively, the air selection control assembly may be controllable to control the supply of air to the first compressor on the basis of the prevailing pressure in the air storage tank.

By way of example, the switch actuator is operable to control a conventional selection valve having a first inlet for the air storage tank and a second inlet for the fresh air inlet. In addition, the selection valve comprises an outlet to the first compressor. In one example, the selection valve is provided in the form of a so called three port/two position valve. This type of valve may also be known as a three-way, two position directional valve. The switch actuator may actuate the selection valve pneumatically or electrically, as is commonly known in the art.

During normal operation of the fuel cell and the vehicle at sufficiently low altitudes, i.e. at normal ambient pressure, the selection valve is in a first user configuration where fresh air is received from the fresh air inlet conduit and subsequently transferred to the first compressor. When there is a demand for using compressed air from the storage tank, e.g. at high altitudes and at high power demands, the selection valve is controlled to switch to a second user configuration in which compressed air is received from the storage tank. By way of example, the switch actuator may have a solenoid actuator operable to move the selection valve of the air selection control assembly between the first and second user configurations. Typically, the air selection control assembly comprising the selection valve and the associated switch actuator is controllable in response to an input signal from a control unit.

Hence, according to at least one embodiment, the system further comprises the control unit in communication with the switch actuator of the air selection control assembly, wherein the switch actuator is configured to operate the selective valve on the basis of instructions from the control unit. The control unit may be an integral part of the air selection control assembly.

Optionally, the system may further comprise a pressure reduction system arranged in-between the first compressor and the air storage tank. The pressure reduction system is configured to reduce the pressure of the high pressure compressed air. By using a pressure reduction system, it becomes possible to supply air to the first compressor at e.g. 1 bar pressure, thus further enabling the fuel cell to deliver the same power as at sea level.

According to at least one embodiment, the air storage tank is arranged in fluid communication with a second compressor for receiving and compressing ambient air and for delivering the compressed air to the air storage tank. The ambient air is generally fresh air supplied from the atmosphere via an additional air filter.

The arrangement of the second compressor is particularly useful when there is a possibility of using excessive energy from a vehicle braking event. In this context, it has been realised that FCEVs generally need additional devices (such as retarders) or sufficiently dimensioned batteries to absorb braking energy generated while driving downhill Retarders may often result in wastage of energy whereas bigger batteries may result in higher vehicle weight and oversizing of the energy storage system to meet just one requirement. By providing a system having an air storage tank arranged upstream and in series with the first compressor so as to permit an efficient and simple storage of compressed air of high pressure, it also becomes possible to improve the capabilities of the vehicle to absorb some amount of energy and power during the braking event. Such excessive energy may even be used to pressurize the air in the system that subsequently can be transferred to the air storage tank for later usage at high altitudes, thereby increasing the likelihood that the fuel cells can provide sufficient power.

The second compressor can thus be used to absorb some part of brake power from the vehicle and use such excessive energy to compress air to high pressure. The high pressure compressed air is then subsequently delivered and stored in the air storage tank to be used for example at high altitudes when there is a high-power request from the fuel cell. This may also allow for recuperating energy more effectively without oversizing the battery/energy storage system of the vehicle.

Hence, according to at least one embodiment, the second compressor is arranged to operate from recuperation of brake energy from a braking event. As such, the second compressor is arranged to absorb energy generated from the braking event. By way of example, the second compressor is drivingly connected to a motor operable from produced power from regenerative braking, whereby the air storage tank is filled, or re-filled, with compressed air from the second compressor during the braking event.

The second compressor may be provided in several different configurations. Typically, the second compressor may be any one of an electrically or mechanically operated compressor. In addition, or alternatively, the second compressor may be configured to operate in any type of driving situation, even when the vehicle is not braking.

Optionally, the system may further comprise a charge air cooler, CAC. The charge air cooler may typically be arranged in-between the first air compressor and the fuel cell. Moreover, the charge air cooler may be configured to reduce the temperature of the compressed air prior to being supplied to the fuel cell.

Optionally, the system may further comprise a humidifier arranged in-between the first air compressor and the fuel cell. The humidifier may be configured to control the humidity of the compressed air prior to being supplied to the fuel cell.

In regard to the control of the air selection control assembly and the control of the system, it should be readily appreciated that the actual flow of air may further be controlled in cooperation with other operational data of the fuel cell system and the vehicle. Such data may generally be stored in the control unit, such as the ECU. Hence, the system may typically comprise a control unit arranged in communication with the air selection control assembly, e.g. in communication with the switch actuator. The control unit may include a microprocessor, microcontroller, programmable digital signal processor or another programmable device. Thus, the control unit typically comprises electronic circuits and connections as well as processing circuitry such that the control unit can communicate with different parts of the system as well as with other components of the fuel cell system such as the fuel cell stack, coolant system, heat exchanger, radiator, pressure sensors, temperature sensors or any other component of the vehicle in order to provide the functions of the example embodiments. The control unit may comprise modules in either hardware or software, or partially in hardware or software and communicate using known transmission buses such as CAN-bus and/or wireless communication capabilities. The processing circuitry may be a general purpose processor or a specific processor. The control unit may typically comprise a non-transitory memory for storing computer program code and data upon. Thus, the control unit may be embodied by many different constructions. The control unit may be part of the air selection control assembly. In other embodiments, the control unit may be part of another system or component and configured to communicate with the air selection control assembly, either by wire or wireless, as is known in the art.

According to a second aspect of the present disclosure, there is provided a fuel cell system comprising a fuel cell stack and a system according to the first aspect of the disclosure. The system is in fluid communication with the fuel cell stack. Effects and features of this second aspect of the present disclosure are largely analogous to those described above in connection with the first aspect of the disclosure. Embodiments mentioned in relation to the first aspect of the present disclosure are largely compatible with the second aspect of the disclosure. The fuel cell stack may comprise a number of fuel cells, wherein the number of fuel cells are arranged in a stack configuration. A fuel cell stack is a device that converts chemical potential energy into electrical energy. By way of example, the fuel cell stack is a Proton Exchange Membrane (PEM) fuel cell stack. A PEM fuel cell stack is particularly suitable for vehicles due to its energy conversion efficiency and package compactness. PEM fuel cells are configured to convert the energy potential of a hydrogen-based fuel into electricity with water and heat as the major by-products.

According to a third aspect of the present disclosure, there is provided an electric powertrain system for a vehicle. The electric powertrain system comprises a fuel cell system according to the second aspect, a battery system, and an electrical machine, wherein the fuel cell system and the battery system are selectively connectable to the electrical machine. Effects and features of this third aspect of the present disclosure are largely analogous to those described above in connection with the first and second aspects of the disclosure. Embodiments mentioned in relation to the first and second aspects of the present disclosure are largely compatible with the third aspect of the disclosure.

According to a fourth aspect of the present disclosure, there is provided a vehicle, preferably an electric vehicle, comprising an electric powertrain system according to the third aspect of the disclosure. According to a fifth aspect of the present disclosure, there is provided a vehicle, preferably an electric vehicle, comprising a system according to the first aspect of the disclosure. Effects and features of the fourth and fifth aspects of the present disclosure are largely analogous to those described above in connection with the first, second and third aspects of the disclosure. Embodiments mentioned in relation to the first, second and third aspects of the present disclosure are largely compatible with the fourth and fifth aspects of the present disclosure.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS OF THE DISCLOSURE

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

Figure 1:
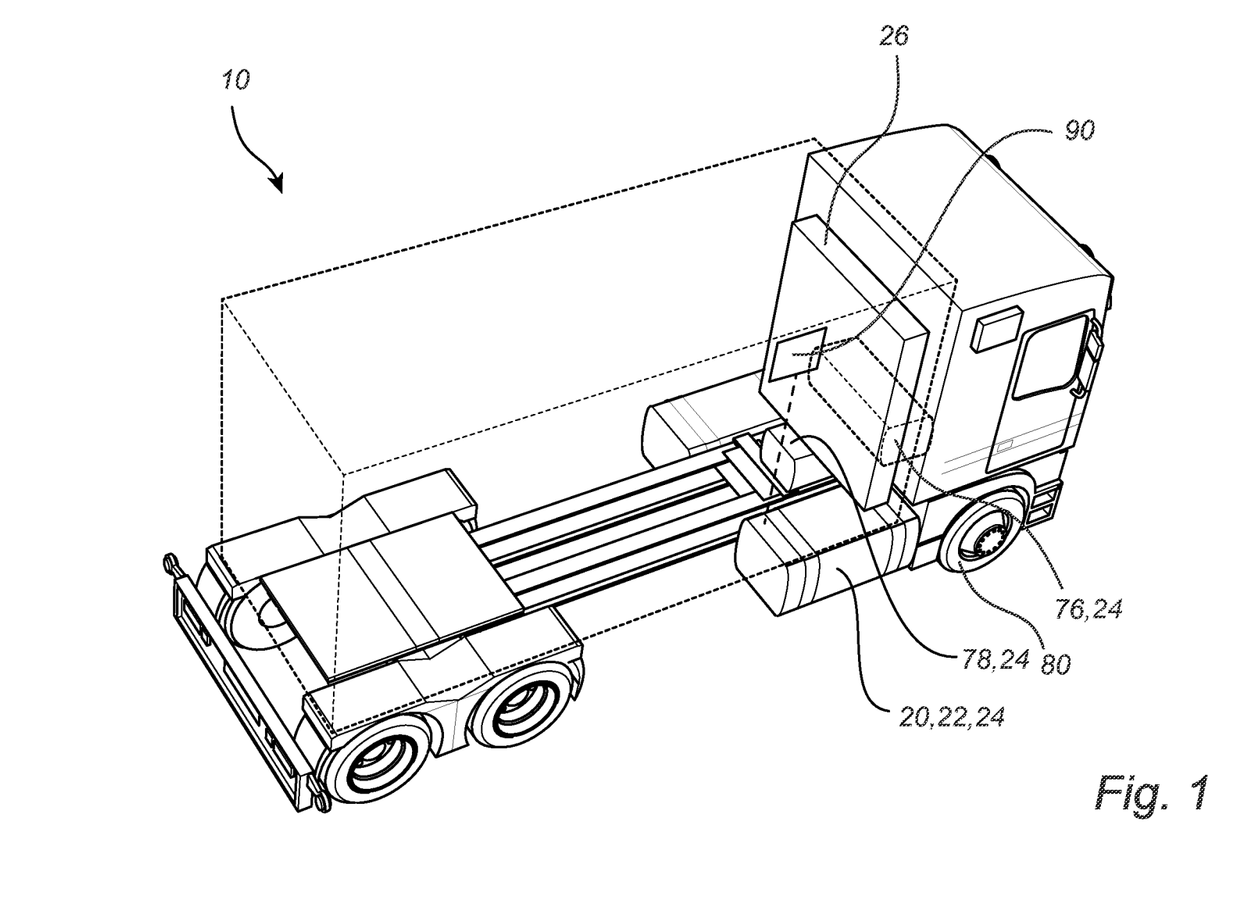
FIG. 1 is a side view of a vehicle comprising a fuel cell system according to an example embodiment of the present disclosure.

With particular reference to FIG. 1, there is provided a vehicle 10 in the form of a fuel cell electric vehicle (FCEV) comprising a fuel cell system 20 according to the present disclosure. The vehicle 10 depicted in FIG. 1 is a truck for which the fuel cell system 20, which will be described in detail below, is particularly suitable for.

FIG. 1 depicts an illustrative example of some of components of the FCEV 10. The fuel cell system 20 comprises a fuel cell stack 22 arranged to generate electricity to propel the vehicle and to power auxiliary equipment. The fuel cell stack 20 comprises a plurality of fuel cells (not shown). The fuel cell stack 22 generally comprises a high number of fuel cells, e.g. 100-300 fuel cells connected in series. The fuel cell system may also comprise a number of fuel cell stacks having a number of fuel cells, respectively.

While FCEVs may be configured in several different manners, the FCEV 10 in FIG. 1 also comprises a battery pack 76 and an electric machine 78. The fuel cell system 20 together with the battery pack 76 and the electric machine 78 form parts of an electric powertrain system 24 for providing traction power to the vehicle 10, as is also at least partly illustrated in FIG. 2.

The FCEV 10 illustrated in FIG. 1 further comprises a hydrogen storage system 26 for storing hydrogen to be used as one of the fuel component for operation of the fuel cell stack 22. The hydrogen storage system 26 may generally be a high-pressure tank for storing pressurized hydrogen. In addition, the FCEV 10 may include an expander (not shown) for reducing the pressure of the hydrogen contained in the high-pressure tank, and a fuel supply line (not shown) for feeding the hydrogen from the high-pressure tank to the fuel cell stack 22 of the fuel cell system 20 via the expander.

In order to power the vehicle 10 in an efficient and reliable manner, the fuel cell stack 22 may generally need to be integrated with the above components and other components to form a complete fuel cell system. Such components may relate to the flow systems to the fuel cell stack 22, including the hydrogen supply system to an anode side of the fuel cell stack, an air supply system to an cathode side of the fuel cell stack, a coolant supply system to the cooling channel(s) of the fuel cell stack and possibly also water supply to a humidifier to humidify the hydrogen and the air flows.

These flow systems and other parts of the fuel cell system 20 are generally controlled by a control unit 90, as illustrated in FIG. 1. Hence, the fuel cell system here comprises the control unit 90 configured to control one or more operations of the fuel cell system 20. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. Moreover, the described functionality of the system control unit may be provided by one or more vehicle ECUs (Electronic Control Units).

In regard to the fuel cell stack 22 of the fuel cell system 20, each one of the fuel cells making up the fuel cell stack 22 generally comprises the anode side receiving hydrogen as a fuel component and the cathode side receiving compressed air as another fuel component. While there are several different types of fuel cells, distinguished mainly by the type of electrolyte used, a so-called Proton Exchange Membrane (PEM) fuel cell is particularly suitable for use in heavy-duty vehicles, such as the vehicle in FIG. 1.

PEM fuel cells have high power density, a solid electrolyte and also a long operational lifetime. PEM fuel cells generally operate in a temperature range of 50 to 100 degrees C. The PEM fuel cell is configured to create electricity from two reactants, hydrogen and oxygen, such as compressed air. Similar to the operation of a battery, the fuel cell contains two electrodes, i.e. an anode and a cathode. The anode and cathode electrodes are typically composed of carbon paper or cloth. These electrodes are separated by a catalyst-coated membrane. The membrane is thus sandwiched between the two electrodes (anode and cathode). The membrane is typically made from a highly conductive material such as Nafion or the like. Hydrogen, stored in the hydrogen storage system 26 (FIG. 1), enters one side of the fuel cell while compressed air, containing needed oxygen, enters the other side. While the hydrogen molecules are transferred through the electrolyte in the fuel cell towards the oxygen, the molecules are separated into electrons and protons. The protons are passed through the membrane while the electrons are transferred to the anode, thereby generating electricity for the FCEV 10 to be used for powering the electric machine 78 and any auxiliaries. When the electrons reach the cathode, the electrons recombine with the protons, react with the oxygen, and form water as the end-product. In other words, hydrogen fuel and compressed air are consumed in the fuel cell stack 22 of the fuel cell system 20 to produce electricity, with water (or water vapor) and heat as the major by-products.

The anode, membrane and cathode are generally sealed together to form a single membrane electrolyte assembly, commonly denoted as the MEA of the fuel cell. Generally, the fuel cell stack further comprises a plurality of bipolar plates arranged in-between the MEAs to form the fuel cell stack configuration of the fuel cell stack 22. The bipolar plate is configured to distribute the hydrogen and compressed air over the active surface area of the fuel cell. Generally, the bipolar plates are further configured to conduct electrical current from the anode of one fuel cell to the cathode of a consecutive fuel cell. Thus, the bipolar plates provide electrical conduction between the cells and removes heat from the active areas. While bipolar plates may differ for different applications, the bipolar plates are generally made of graphite or stamped metal. Moreover, it should be appreciated that the fuel cell stack 22 may comprise conventional end plates that further support the fuel stack 22 as well as a surrounding gasket to prevent the gases from escaping from between the bipolar plates of the fuel cell stack 22.

In addition, the fuel cell system 22 typically comprises a coolant system (not shown) for cooling the fuel cells of the fuel cell stack 22. The coolant system is connected to a coolant circuit, which has an electrically operated feed pump that circulates a coolant therein. The process heat created in the operation of the fuel cell(s) may be emitted to the environment via a radiator, which may likewise be located within the coolant circuit.

Due to the various flow systems of the fuel cell system 20, the fuel cell stack 22 comprises a number of inlets and outlets, as is generally known in the art, such as a cathode inlet and a cathode outlet, an anode inlet and an anode outlet, and a coolant inlet and a coolant outlet. The FCEV may also include other components as is commonly known in the field of fuel cell systems, and thus not further described herein. The above components and systems may collectively be denoted as the balance of plant of the FCEV 10, which is a common term used within FCEVs. The balance of plant refers to and encompasses typically all components of the fuel cell system except the fuel cell stack itself.

Figure 2:
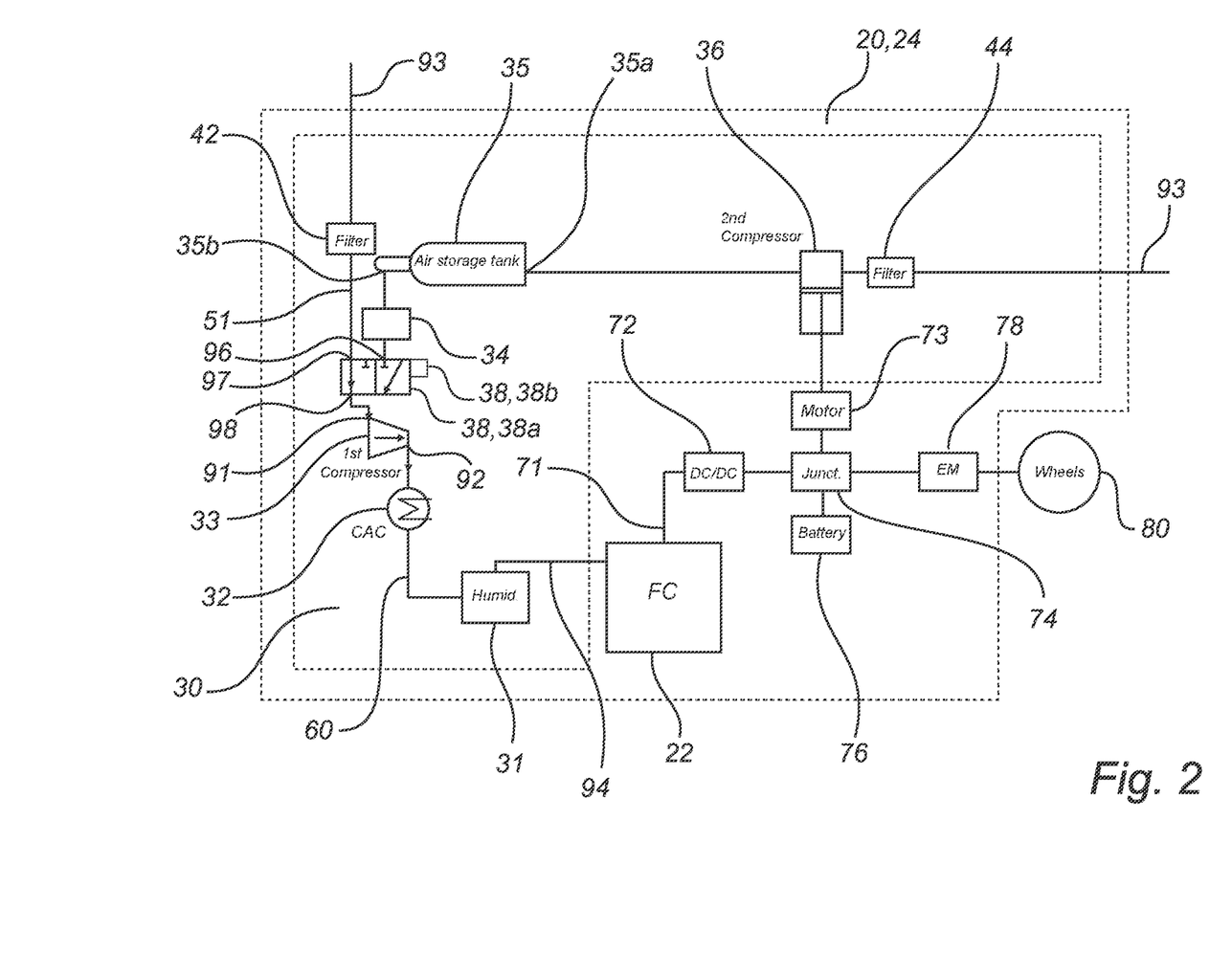
FIG. 2 schematically illustrates an example embodiment of an electric powertrain system of the vehicle illustrated in FIG. 1, further including a fuel cell system having a system for supplying compressed air to a fuel cell stack of the fuel cell system.

Referring now to FIG. 2, an illustrative example of further parts of the fuel cell system 20 of FIG. 1 is depicted. The fuel cell system 20 here comprises the fuel cell stack 22 and an oxygen supply system 30, which in the following description may simply be denoted as the system 30 for ease of reference.

The system 30 is arranged to supply compressed air to the fuel cell(s) of the fuel cell stack 22, as illustrated in FIG. 2. The system 30 has a fluid circuit 60 connecting the components making up the system 30, as further described herein. The fluid circuit 60 is configured to transport a fluid medium in the form of air. In normal operation of the fuel cell system 20 at normal altitudes, the desired quantity of air is typically extracted from the ambient atmosphere and made available to the fuel cell at the necessary pressure level for generating electricity. The air is generally supplied from an air inlet conduit 51 in fluid communication with fresh air from the surroundings (atmosphere) 93 of the vehicle 10. The fresh air is subsequently compressed to an appropriate pressure level by a first compressor 33. Optionally, there is also an air filter 42 disposed in the air inlet conduit 51. Hence, the system 30 as shown in FIG. 2 comprises the first compressor 33 disposed in the fluid circuit 60 and the inlet conduit 51 in fluid communication with the first compressor 33.

The first compressor 33 is configured to pressurize air. The first compressor may be of a conventional compressor type, such as an electrical first compressor or a mechanical first compressor 33. The first compressor 33 comprises an inlet 91 for receiving air from the fresh air inlet conduit 51. In this example, the first compressor 33 is arranged in direct fluid communication with the atmosphere, indicated by reference numeral 93, for receiving the fresh air, as illustrated in FIG. 2.

The first compressor 33 also comprises an outlet 92 for delivering compressed air to the fuel cell stack 22. The compressed air is supplied to the cathode side of the fuel cell stack 22 via a conduit of the fluid circuit 60 to an air inlet of the cathode side of the fuel cell stack 22, which is arranged to receive the compressed air for delivery to the cathode side of the fuel cells of the fuel cell stack 22. The air inlet of the cathode side of the fuel cell stack is indicated by reference numeral 94 in FIG. 2, and may simply be denoted as the cathode inlet 94 in the following description. The generated electricity from the fuel cell stack 22 is then transferred to the electrical machine 78 via a power connection 71. The other inlets and outlets of the fuel cell stack are not explicitly illustrated in FIG. 2, but may be arranged as is commonly known in the art.

While the outlet 92 of the first compressor 33 may in some examples be directly connected to the fuel cell stack 22, the system 30 typically comprises a charge air cooler, CAC, 32 and a humidifier 31 disposed in the fluid circuit 60 between the first compressor 33 and the fuel cell stack 22, as also illustrated in FIG. 2.

More specifically, the system 30 optionally comprises the CAC 32 arranged in-between the first air compressor 33 and the humidifier 31. The CAC 32 is configured to reduce the temperature of the compressed air downstream, and prior to being supplied to, the fuel cell(s) of the fuel cell stack 22. The CAC 32 is integrated into the system 30 due to the high temperature of the air leaving the first compressor 33. Therefore, the CAC 32 may be used to reduce the compressed air temperature before the compressed air enters the fuel cell stack 22.

As also illustrated in FIG. 2, the humidifier 31 is here arranged in-between the first air compressor 33 and the fuel cell stack 22. The humidifier 31 is used to add vapor into the compressed air flow in order to prevent dehydration of the membrane of the fuel cell. Accordingly, the humidifier 31 is here configured to control the humidity of the compressed air downstream and prior to being supplied to the fuel cell(s) of the fuel cell stack 22. The humidifier is in fluid communication with the fuel cell(s) of the fuel cell stack 22 via the cathode inlet 94, as illustrated in FIG. 2.

The system 30 also comprises an air storage tank 35, as illustrated in FIG. 2. The air storage tank 35 is configured to store compressed air of relatively high pressure. It should be readily appreciated that the air storage tank 35 is generally also configured to receive compressed air and further transfer the compressed air, and thus comprises a corresponding compressed air inlet 35a and compressed air outlet 35b. The pressure of the compressed air may vary for different vehicles and fuel cell systems. By way of example, the pressure of the compressed air may be at least above 300 bar. However, the compressed air may likewise be stored at a different pressure level in the air storage tank 35 than 300 bar depending on the available space in the vehicle and e.g. the size of the air storage tank 35. In general, if the system 30 provides for storing compressed air of an even higher pressure, such storage may allow for reducing the size of the air storage tank or for storing a greater amount of compressed air.

As illustrated in FIG. 2, the air storage tank 35 is arranged upstream and in series with the first compressor 33. In this manner, the air storage tank 35 is arranged to deliver compressed air to the first compressor 33 in situations when the ambient pressure of the air surrounding the vehicle is insufficient, e.g. when the vehicle is operated at high altitudes and/or at high power requests. The control of supply of air to the first compressor 33 is performed by an air selection control assembly 38, which will be further described hereinafter. Moreover, it is believed that arranging the air storage tank 35 in series with the first compressor 33 allows for a more compact system 30.

In order to deliver compressed air to the air storage tank 35 in an efficient and simple manner, the air storage tank 35 is here arranged in fluid communication with a second compressor 36, as illustrated in FIG. 2. The second compressor 36 is configured to compress ambient air and to deliver the compressed air to the air storage tank 35. By way of example, the second compressor 36 is operated to pressurize the air to a pressure level of at least 300 bar. It should be readily appreciated that the air storage tank 35 is thus also configured to receive compressed air from the second compressor 36 so as to store the compressed air for use at higher altitudes when the atmospheric pressure is low. However, the compressed air may likewise be stored at a different pressure depending on the available space in the vehicle and e.g. the size of the air storage tank 35.

The air supply to the second compressor 36 can be provided in several different manners. As illustrated in FIG. 2, the second compressor 36 is arranged to receive fresh air from the atmosphere 93 via an air filter 44.

Optionally, the second compressor 36 is arranged to operate from recuperation of brake energy from a braking event. As such, the second compressor 36 is operable to absorb energy generated from the braking event. To this end, the second compressor 36 is arranged to receive power from the electrical machine 78. In other words, in the FCEV 10, the electrical machine(s) may often be used for braking while driving downhill. In such driving situations, a huge amount of generated power and energy needs to be stored somewhere or dissipated. If the battery system, or any other energy storage system, is small, the generated energy and power needs to be dissipated using retarder devices which results in wastage of energy. In this context, the second compressor 36 is configured to be used to absorb some part of this brake power and subsequently use it to compress air to a higher pressure, which can be stored in the air storage tank 35 to be used at later stage, for example at high altitudes. Such configuration allows for providing an electrical powertrain system where energy is recuperated more effectively without oversizing the battery system or any other energy storage system.

In addition, or alternatively, the second compressor may be an electrically operated compressor powered directly by the battery system 76.

As mentioned above, the system 30 also comprises the air selection control assembly 38, as shown in FIG. 2. The air selection control assembly 38 is configured to control the supply of air from one of the air storage tank 35 and the fresh air inlet 51 to the first compressor 33. The air selection control assembly 38 comprises a selection valve 38a. The selection valve 38a is arranged in-between the air storage tank 35 and the inlet 91 of the first compressor 33. Moreover, the selection valve 38a is arranged in fluid communication with the air inlet conduit 51 for receiving fresh air from the atmosphere 93. The air selection control assembly 38 is configured to control the flow of air to the first compressor 33. In particular, the air selection control assembly 38 is configured to selectively control the income of air so that air is supplied either from the air storage tank 35 to the first compressor 33 or from the fresh air inlet conduit 51 to the first compressor 33. By way of example, the air selection control assembly 38 further comprises a switch actuator 38b configured to operate the selection valve 38a. As such, the switch actuator 38b is configured to operate the selection valve 38a to selectively control a flow of air to the first compressor 33 such that air can be supplied from the air storage tank 35 to the first compressor 33 or from the fresh air inlet conduit 51 to the first compressor 33.

In the present case, the selection valve 38a is a conventional selection valve comprising a first inlet 96 for the air storage tank 35 and a second inlet 97 for the fresh air inlet conduit 51. Accordingly, the selection valve 38a is arranged in fluid communication with the air storage tank 35 and the first compressor 33. The selection valve 38a is also in fluid communication with the atmosphere at 93 for receiving fresh air. In addition, the selection valve 38a comprises an outlet 98 to the first compressor 33. By this arrangement, the air selection control assembly 38 is configured to control the supply of air to the first compressor 33 via the selection valve 38a and the switch actuator 38b, such that air is either supplied from the fresh air inlet conduit 51 or from the air storage tank 35. The selection valve 38a may be actuated pneumatically or electrically by means of the switch actuator 38b, as is commonly known in the art. During normal operation of the fuel cell system and the vehicle, the selection valve 38a is generally set in a first user configuration where fresh air is received from the fresh air inlet conduit 51 and subsequently transferred to the first compressor 33. However, in more demanding driving situations where the vehicle is requiring a high-power demand and/or at high altitudes, the air characteristics of the air from the surroundings of the vehicle may not be sufficient for operating the fuel cell stack 22. In such situations, there is thus more favorable to supply stored compressed air from the air storage tank 35. Hence, when there is a demand for using compressed air from the air storage tank 33, the selection valve 38a is controlled to switch to a second user configuration, in which compressed air is received from the air storage tank 35. While there are several different configurations of designing the air selection control assembly 38, the air selection control assembly 38 illustrated in FIG. 2 comprises a solenoid switch actuator 38b operable to move the selection valve 38a of the air selection control assembly 38 between the first and second user configurations.

In regard to the further operation of the air selection control assembly 38, the air selection control assembly 38 is here controllable in response to a control signal from the control unit 90. The air selection control assembly 38 is thus configured to control the supply of air to the first compressor 33 in response to a signal from the control unit 90 indicating an inadequate level of pressure at the inlet 91 of the first compressor 33 as compared to the pressure level at the sea level.

The control signal generally contains data with respect to a determined air characteristic level of the air surrounding the vehicle, i.e. the atmospheric air. By way of example, the air characteristic level is any one of an ambient pressure level and an air quality level. The ambient pressure level may typically be determined by a sensor, such as a pressure sensor arranged to monitor the ambient pressure outside the vehicle. Analogously, the air quality level may be determined by a suitable sensor configured to measure the quality of the air outside the vehicle. Based on data from at least one of these sensors, the air selection control assembly 38 can be controlled to switch between receiving air from the fresh air inlet conduit 51 and receiving compressed air from the air storage tank 35. Generally, the air selection control assembly 38 is controllable to direct air from the fresh air inlet conduit 51 to the first compressor 33 during substantially normal operation of the vehicle at normal ambient pressure and direct air from the air storage tank 35 to the first compressor 33 during a high-load operation of the vehicle at high-pressure atmospheric level.

Accordingly, by the arrangement of the air storage tank 35 in combination with the air selection control assembly 38 and the first compressor 33, it becomes possible to control air supply to the first compressor 33, either by directing air from the air storage tank 35 to the first compressor 33, e.g. at high altitudes, or directing fresh air from the fresh air inlet conduit 51 to the first compressor 33, e.g. at sea level. By arranging the air storage tank 35 in series with the first compressor 33, it becomes possible to store compressed air at high pressure in various operating situations of the fuel cell. By way of example, when the fuel cell of the vehicle is operated at high altitudes, the stored compressed air can be expanded and transferred to the air supply system of the fuel cell at a 1 bar pressure (at 4000 m ambient pressure is likely to be about 0.6 bar). In this manner, the system 30 allows for providing the same pressure at the inlet 91 of the first compressor 33 as at the sea level. As such, the system 30 is configured to improve the reliability of the fuel cell system during driving situations at high altitudes where the atmospheric pressure level is inadequate for operating the first compressor 33.

More specifically, during the normal operation of the FCEV 10, e.g. at sea level and low altitudes, the air selection control assembly 38 is arranged in the first user configuration where the first compressor 33 is connected directly to the atmospheric condition. However, when the control unit 90 detects that there is a significant pressure loss upstream of the first compressor 33, e.g. due to high altitude, the air supply is switched using the air selection control assembly 38 from atmospheric to the one stored in the air storage tank 35. By using a pressure reduction system 34, as further described herein, the air from the air storage tank 35 can be provided to the first compressor 33 at 1 bar pressure, thus enabling the fuel cell to deliver the same power as at sea level.

Then, during the braking operation (normal driving situation or while driving downhill), the electric machine(s) 78 produces electrical power which can be used to operate the second compressor 36 using a high voltage motor 73, as illustrated in FIG. 2. The second compressor 36 can be sized to have a certain flow rate and pressure thus enabling the system 30 to refill the air storage tank 35 in a desired amount of time. Moreover, the sizing of the second compressor 36 and the air storage tank 35 may also be selected in view of the required amount of energy and power to be absorbed while driving downhill, thus allowing the system 30 to minimize the size of the battery system and any usage of a retarder device.

It should be noted that the operation of delivering compressed air from the air storage tank 35 to the first compressor 33 may generally also be controlled in view of the prevailing capacity of the air storage tank. By way of example, the system 30 is further controlled based on the prevailing pressure in the air storage tank 35 and the volume of the air storage tank 35. Thus, it should also be readily appreciated that the actual amount of air flow may be controlled in cooperation with other operational data of the fuel cell system and the vehicle. Such data may generally be gathered by conventional sensors, such as pressure and temperature sensors, and subsequently stored in the control unit 90, or in the ECU.

It should also be readily appreciated that the control unit 90 can be a part of an electronic control unit (ECU) for controlling the vehicle and various parts of the vehicle. In particular, the control unit 90 is arranged in communication with the fuel cell system 20 and the system 30. It may also be conceivable that the system 30 itself comprises the control unit 90 configured to allow control of the air selection control assembly 38 and the other components making up the system 30 so as to control the flow of air to the first compressor 33. It should be noted that the precise control of the system 30 and the air selection control assembly 38 depends on the particular application and the particular operation conditions.

In the example embodiment illustrated in FIG. 2, the system 30 here also comprises the pressure reduction system 34, such as pneumatic pressure regulator. The pressure reduction system 34 is arranged in-between the first compressor 33 and the air storage tank 35. More specifically, the pressure reduction system 34 is arranged in-between the selection valve 38a (of the air selection control assembly 38) and the air storage tank 35. The pressure reduction system 34 is configured to reduce the pressure of the high-pressure compressed air from the air storage tank 35. The pressure reduction system 34 may also be provided in the form of an expander. By using an expander as the pressure reduction system 34, it may be possible to generate further electricity and thus provide an even more efficient system 30 and fuel cell system 20.

In FIG. 2 there is also illustrated how the fuel cell stack 22 of the fuel cell system 20 is connected to the other parts of the FCEV for providing traction power via the one or more wheels 80. The FCEV 10 illustrated in FIGS. 1 and 2 is configured in a series hybrid design where the fuel cell stack 22 of the fuel cell system 20 is paired with the battery system (battery pack) 76. In addition, the electric powertrain system 24 of the FCEV here also includes a DC/DC converter 72. The function of the DC/DC converter 72 is to provide the power from fuel cell(s) of the fuel cell stack 22 at the right voltage as of the traction/battery system. The electric powertrain system 24 also includes a junction box 74. The junction box 74 is a housing that serves as the communal meeting spot for the electrical wires and will redirect the current/power to the different components. In addition, the electric powertrain system 24 includes the high voltage motor 73 for driving the second compressor 36. In other words, the junction box 74 is here configured to connect the fuel cell stack 22 to the high voltage motor 73, battery pack 76 and the electrical machine 78. Traction power to the wheels 80 is delivered by any one of the battery pack 76 and the fuel cell stack 22 of fuel cell system 20. By way of example, the battery pack 76 is connected via the junction box 74 to the electrical machine 78 that provides motive power to the vehicle, while the fuel cell stack 22 of the fuel cell system 20 supplies energy to the electrical machine 78 and/or delivers power to the battery pack 76 via the DC/DC converter 72 and the junction box 74, as is commonly known in the field of FCEVs. In other words, a typical FCEV may also use traction batteries or capacitors, inverters, and electric motors for providing traction power to the vehicle. In a regenerative mode of the system during the braking event, where the electrical machine 78 is operated as a generator, power from the electrical machine 78 will be transferred to the high voltage motor 73 and then to the second compressor 36. As an example, if 100 kW is transferred from the electrical machine 78, the junction box 74 might split the amount of power so that 50 kW is transferred to the high voltage motor 73 and 50 kW to the battery pack 76. The control of such power transfer from the junction box 74 may be determined by the control unit, such as the ECU, while the actual routing of power will be handled by the junction box.

It should be noted that the configuration of the FCEV 10 and the fuel cell system 20 illustrated in FIGS. 1 and 2 is only one of many suitable configurations for a FCEV to be used with the system 30. By way of example, the fuel cell system 20 may include a plurality of fuel cell stacks arranged in a parallel configuration with the battery system. In addition, the battery system may include a plurality of battery packs. In addition, or alternatively, the battery system may be an integral part of the fuel cell system. Also, it should be readily appreciated that the system may be operable without the high voltage motor 73 depending on the type of second compressor. The high voltage motor 73 is primarily configured to drive a mechanical second compressor. However, if the second compressor is an electrical second compressor, such electrical compressor may generally be provided with an integrated high voltage motor. Thus, the powertrain system 24 may be designed with or without the high voltage motor 73 depending on the selected type of second compressor.

Moreover, the electrical powertrain system may include or be connected to a bi-directional charging port capable of both receiving energy from and providing energy to an external power supply. Such an external power supply may for example be a charging station connected to the power grid, a battery or another vehicle. The electrical powertrain system 24 can be considered to comprise one or more electrical machines connected to one or more wheels 80 of the vehicle, either directly or via a transmission arrangement (not shown). The vehicle may further comprise a combustion engine (not shown) for vehicle propulsion, and the combustion engine, battery, and fuel cells can together be controlled to provide power to the vehicle in an efficient manner.

As mentioned above, the present disclosure provides a system 30 and a fuel cell system 20 capable of providing compressed air to the fuel cell(s) of the fuel cell stack with a substantially equal pressure in a more reliable manner for different altitudes of the fuel cell stack and vehicle above sea level. That is, the system 30 allows for providing essentially the same pressure at the inlet of the first compressor 33 as the pressure level at the sea level. Hereby, there is provided an improved operation of the FCEV at high altitudes. To this end, the system 30 contributes to a more reliable operation of the fuel cell system in that a substantially same level of power as at sea level can be delivered also for a sufficient duration at high altitudes.

The system 30 can be incorporated into a fuel cell system 20 for a vehicle 10, such as an electric vehicle. In this type of application, the system 30 is in fluid communication with the fuel cell(s) of the fuel cell stack 22. As schematically illustrated in FIGS. 1 and 2, there is also provided an electric powertrain system 24 for the vehicle 10, comprising the fuel cell system 20, the battery system 76 and the electrical machine 78, wherein the fuel cell system 20 and the battery system 76 are selectively connectable to the electrical machine 78, e.g. by the junction box 74. As such, the vehicle 10 comprises the electrical powertrain system 24 for providing propulsion to the vehicle 10.

It is to be understood that the present disclosure is not limited to the embodiments described above and illustrated in the drawings; rather, the skilled person will recognize that many changes and modifications may be made within the scope of the appended claims.

The invention claimed is:

1. A system for supplying compressed air to a fuel cell of a vehicle the system comprising:
a first compressor having an inlet for receiving air and an outlet for delivering compressed air to the fuel cell;
an air storage tank arranged upstream and in series with the first compressor, and configured to store compressed air of high pressure; and
an air selection control assembly comprising a selection valve and a switch actuator configured to operate the selection valve;
wherein the selection valve is arranged in between the air storage tank and the inlet of the first compressor, and further in fluid communication with an inlet conduit for receiving fresh air;
wherein the switch actuator is configured to operate the selection valve to selectively control a flow of air to the first compressor such that air can be supplied from the air storage tank to the first compressor or from the fresh air inlet conduit to the first compressor; and
wherein the air selection control assembly is controllable to control the flow of air in response to a determined air characteristic level being any one of an ambient pressure level and an air quality level, such that a supply of air to the first compressor is provided from the air storage tank if the determined air characteristic level is below a threshold value.

2. The system of claim 1, wherein the air selection control assembly is controllable to control the flow of air from the fresh air inlet conduit to the first compressor during normal operation of the vehicle at normal ambient pressure.

3. The system of claim 1, further comprising a control unit in communication with the switch actuator of the air selection control assembly, wherein the switch actuator is configured to operate the selective valve on the basis of instructions from the control unit.

4. The system of claim 1, further comprising a pressure reduction system arranged in between the first compressor and the air storage tank, the pressure reduction system being configured to reduce the pressure of the high pressure compressed air.

5. The system of claim 1, wherein the air storage tank is further arranged in fluid communication with a second compressor for receiving and compressing ambient air and for delivering the compressed air to the air storage tank.

6. The system of claim 5, wherein the second compressor is arranged to operate from recuperation of brake energy from a braking event.

7. The system of claim 6, wherein the second compressor is drivingly connected to a motor operable from produced power from regenerative braking, whereby the air storage tank is filled, or re-filled, with compressed air from the second compressor during the braking event.

8. The system of claim 1, further comprising a charge air cooler (CAC) arranged in between the first air compressor and the fuel cell, and configured to reduce the temperature of the compressed air prior to being supplied to the fuel cell.

9. The system of claim 1, further comprising a humidifier arranged in between the first air compressor and the fuel cell, and configured to control the humidity of the compressed air prior to being supplied to the fuel cell.

10. A fuel cell system comprising a fuel cell stack and the system of claim 1, wherein the system is in fluid communication with the fuel cell stack.

11. An electric powertrain system for a vehicle, comprising the fuel cell system of claim 1, a battery system, and an electrical machine, wherein the fuel cell system and the battery system are selectively connectable to the electrical machine.

12. A vehicle comprising the electric powertrain system according to claim 11 for providing propulsion to the vehicle.

* * * * *